United States Patent Office 2,804,423
Patented Aug. 27, 1957

2,804,423

IRON-VITAMIN COMPOSITION

Melville Sahyun, Santa Barbara, Calif.

No Drawing. Application October 15, 1953,
Serial No. 386,381

3 Claims. (Cl. 167—81)

This invention relates to a therapeutic composition and is more particularly concerned with a material containing in intimate combination, vitamin $B_{12}$ and/or folic acid, and iron versenate.

Generally, certain B complex vitamin deficiencies are also associated with an iron deficiency. Additionally, it has been found that presence of iron may assist the therapeutic efficacies of the assimilation of vitamin $B_{12}$ or folic acid in the treatment of certain types of anemias. In order to provide a useful composition for correcting such amenias and vitamin deficiencies it has been attempted to incorporate both iron and vitamin $B_{12}$ or folic acid in the same composition. However, prior to the provision of the invention herein described and claimed, the intimate contact of iron and vitamin $B_{12}$ has caused rapid deterioration of the vitamin $B_{12}$ to a therapeutically inactive material.

It has now been found and is first described that a composition may contain intimately contacted iron and vitamin $B_{12}$ in a tablet or capsule if the iron is present as ferric versenate (ferrin ethylenediaminotetraacetate). Ferric versenate is available in the channels of commerce as Sequestrene, sodium iron, and contains thirteen percent available iron. Desirably, the composition of the present invention contains both vitamin $B_{12}$ and folic acid, however, the provision of one or the other is also satisfactory. Generally speaking, it is preferred that about five micrograms of vitamin $B_{12}$ be employed with two to five milligrams of folic acid, and sufficient ferric versenate to provide 25 milligrams of ferric iron. However, it is to be understood that the folic acid or vitamin $B_{12}$ may be eliminated entirely, or increased by substantial percentages, up to as much as fifty micrograms of vitamin $B_{12}$ to one milligram of folic acid, or down to whatever percentage of each material may be desirable. Of course, the ferric versenate may be widely varied depending upon the particular physiological action desired, however, the composition above-described is the preferred composition.

Optionally, vitamin C may be included in the formulation to aid in the utilization of iron in the stomach. Preferably, approximately 100 milligrams of vitamin C (ascorbic acid) are employed, however, it is to be understood that less or greater amounts of vitamin C may also be employed, the essential aspect of this invention being a provision of ferric iron and vitamin $B_{12}$ or folic acid in the same capsule without deterioration of the vitamin $B_{12}$ and/or folic acid.

Certain tests were run to show the stability of the composition of the present invention, and the following results were obtained:

A composition comprising 190 milligrams of a sodium ferric versenate containing 25 milligrams of ferric iron, was prepared by intimate mixture with five micrograms of vitamin $B_{12}$ and five milligrams of folic acid. An initial assay on this material showed a 102 percent of materials used, and after three months at room temperature, 112 percent of the material used, was shown. Since the testing procedure for vitamin $B_{12}$ is only accurate to within ten percent at the present time it may be seen that there was substantially no deterioration of the vitamin $B_{12}$. A similar material, comprising 25 milligrams of ferric iron as ferric sulfate, five micrograms of vitamin $B_{12}$ and five milligrams of folic acid showed a deterioration to fifteen percent of the vitamin $B_{12}$ originally present.

At forty degrees centigrade after a period of two weeks, there was 102 percent of activity present, after six weeks at forty degrees centigrade, a 100 percent, and after three months at forty degrees centigrade, there was 100 percent of activity remaining.

It has been suggested in the past that ferric citrate be combined with the vitamin $B_{12}$ and/or folic acid. However, this has not been received with wide acceptance, nor has it been satisfactory, because the ferric citrate is fully absorbed, but not effectively utilized, by the human body and does not provide the necessary amount of iron present to alleviate the normal anemic conditions.

Various modifications may be made in the method of the present invention without departing from the spirit or scope thereof, and it should be understood that I limit myself only as defined in the appended claims.

I claim:
1. A composition which comprises: ferric ethylenediaminotetraacetate in intimate contact with a material selected from the group consisting of vitamin $B_{12}$ and folic acid.
2. A composition which comprises: ferric ethylenediaminotetraacetate, vitamin $B_{12}$ and folic acid.
3. A composition which comprises: 25 milligrams of iron as ferric ethylenediaminotetraacetate, five micrograms of vitamin $B_{12}$ and five milligrams of folic acid tableted for human oral administration.

References Cited in the file of this patent

UNITED STATES PATENTS 2,695,860    Weidenheimer et al. _____ Nov. 30, 1954

OTHER REFERENCES

Snell Jour. of Biol. Chem., vol. 139 (1939), pp. 675 to 679, Dispensatory, 24th ed., 1947, pp. 465–466.

Skeggs: Jour. of Biol. Chem., vol. 184, may 1950, pp. 211–221.

Jacobson: Chem. Abstracts, vol. 45, 1951, p. 9146 c.

Howard: Modern Drug Encyclopedia, 5th ed., (1952), p. 849.

Brendel: Jour. of Amer. Pharm. Assoc. Sci. ed., vol. 42, Mar. 1953, pp. 123–124.